United States Patent [19]
Blixt et al.

[11] Patent Number: 6,014,465
[45] Date of Patent: Jan. 11, 2000

[54] METHOD FOR TRANSFORMING A GRAY-LEVEL IMAGE INTO A BLACK-AND-WHITE IMAGE

[75] Inventors: Christian Björn Stefan Blixt, Järfälla; Stefan Sven Blixt, Bålsta, both of Sweden

[73] Assignee: Christian Bjorn Stefan, Jarfalla, Sweden

[21] Appl. No.: 08/913,415

[22] PCT Filed: Mar. 19, 1996

[86] PCT No.: PCT/SE96/00347

§ 371 Date: Sep. 17, 1997

§ 102(e) Date: Sep. 17, 1997

[87] PCT Pub. No.: WO96/29676

PCT Pub. Date: Sep. 26, 1996

[30] Foreign Application Priority Data

Mar. 20, 1995 [SE] Sweden .................................. 9500975

[51] Int. Cl.[7] ................................ G06K 9/36; H04N 1/40
[52] U.S. Cl. ........................ 382/237; 382/272; 382/273; 358/429; 358/455; 358/466
[58] Field of Search ..................... 358/465, 456, 358/466, 455; 382/237, 272, 270, 273

[56] References Cited

U.S. PATENT DOCUMENTS

| | | | |
|---|---|---|---|
| 4,837,846 | 6/1989 | Oyabu et al. . | |
| 4,850,029 | 7/1989 | Moyer et al. . | |
| 4,903,316 | 2/1990 | Hongo et al. | 382/52 |
| 5,608,814 | 3/1997 | Gilmore et al. | 382/270 |
| 5,838,463 | 11/1998 | Gahang | 358/465 |

OTHER PUBLICATIONS

Rafael C. Gonzales et al., "Digital Image Processing", 1993, Addison–Wesley Publishing Company, p. 183, line 7–line 22; p. 443–p. 444.
Patent Abstracts of Japan, vol. 18, No. 69, E–1502, abstract of JP, A, 5–284356 (Seiko Epson Corp), Oct. 29, 1993.
Patent Abstracts of Japan, vol. 5, No. 55, E–52, abstract of JP, A, 56–6523 (Hitachi Seisakusho K.K.), Jan. 23, 1981.

*Primary Examiner*—Scott Rogers
*Attorney, Agent, or Firm*—Young & Thompson

[57] ABSTRACT

According to the invention there is provided a method for transforming a gray-level image, divided into pixels, into a black-and-white image, comprising the steps of: dividing the gray-level image into a number of generally square sub images which comprise more than one pixel; calculating and storing, for each sub image, at least one measurement value representing the gray-level of the sub image; calculating, for each sub image, a threshold value based on the measurement values of the sub image, and a number of sub images that are adjacent the sub image; and transforming, for each sub image, each pixel in the sub image to either a white or a black pixel depending upon whether the gray-level of the pixel exceeds the threshold value of the sub image or not. Preferably, parts of the gray-level image, the measurement value or values that is/are calculated, for each sub image, and the threshold value that is calculated, for each sub image, are temporarily stored in one or more memory buffers. These data are stored only as long as they are needed for calculation and/or transformation and are then written over by new data.

13 Claims, 2 Drawing Sheets

METHOD FOR TRANSFORMING A GRAY-LEVEL IMAGE INTO A BLACK-AND-WHITE IMAGE

TECHNICAL FIELD OF THE INVENTION

The present invention relates to a method for transforming a gray-level image into a black-and-white image, and in particular for transforming an image that has been read by a scanner.

PRIOR ART

A gray-level image is normally considered as a number of pixels which all together cover the complete image area. To each picture element, also called pixel, there is associated an intensity value. This value is a digital value, often several bits wide. If, by way of example, the intensity value is 8 bits wide then it can be represented by one of $2^8=256$ possible different values, or so called gray-levels.

Image data in gray-level form can be obtained from a number of different equipments such as video equipments, conventional scanner machines, laser scanners, fax machines or computers.

In particular, when reading images or documents by means of a scanner or image reader, signals with digital values of 8 bits are normally produced. A scanner illuminates the image or document and examines the intensity of the reflected light in a large number of points that are arranged regularly in a point raster over the surface. Each such discrete point is represented by a pixel on the gray-level image, and a quantized intensity value, a gray-level, is produced depending upon the measured reflectivity of the point.

The image processing executed on these image data often starts with a transformation into an image representation of only two different intensity values, black (0) or white (1), i.e. a binary image. This gives an often well needed reduction of data (by a factor of 8) and efficient transmission and/or compact storing of image data can be obtained by further compression using special algorithms for images with binary intensity values. There even exist specific compression algorithms for this type of images. CCITT has standardized this type of algorithms for use in telefax technology.

In most cases, the transformation is accomplished by comparing intensity values of the original image with a threshold value, intensities over the threshold level being classified as white and intensities below the same level as black.

However, the reflected light varies in strength due to a number of reasons, and in practice there exist not only two light intensities on a typical image- or document surface. Even though a document is evenly illuminated and consists of clean white paper with black printing, the light measurement will sometimes, e.g. when a contour falls within the aperture, give rise to levels between black and white. The scanner does not measure the light in an infinitely small point, but always examines a surface area of a certain extent. If the threshold value lies closer to black than white, then, by way of example, a document that has been read by a scanner and transformed into binary form may exhibit text that is "thinner" than on the original, with a risk for interruptions in thin sections. Correspondingly, the text may become "fatter" with a risk for bridging between characters if the threshold value lies too far in the other direction. Accordingly, an incorrectly selected threshold value may deteriorate the readability of a document and seriously aggravate OCR (Optical Character Recognition). Consequently, the method used for transforming gray-level images into black-and-white images is of considerable importance for the quality and readability of a transformed document.

Known methods for finding an appropriate threshold value are often based on examining of the complete image area. A simple principle is to set the threshold value midway between the greatest value and the smallest value that are found. A more sophisticated method is to construct, in principle, a histogram with a bar for each one of a number of partial intervals, where the height of the bar indicates the number of pixels that have values within the interval. For a typical black-and-white document this histogram should have two peaks, whereby the threshold value is selected midway between the peaks. These methods can also be applied to smaller partial areas.

Another method consists in determining a threshold value for each pixel based on intensity values (gray levels) of pixels in the closest neighborhood. This is conveniently executed in two dimensions, i.e. the neighborhood is examined both in x- and y-direction. However, this means that the original intensity values have to be used several times since neighborhoods of different pixels may overlap each other. The greater the neighborhood that one wishes to consider when calculating the threshold value, the greater overlap and the more times the same intensity values have to be used. Even when considering relatively small neighborhoods, this will require an extreme number of calculations.

U.S. Pat. No. 4,850,029 relates to a method for thresholding a document that has been read by a scanner. The image area is divided into a number of columns, each of which is several pixels wide. A threshold value for each column is calculated at each scan line based on the mean values for the column and the contiguous columns. The intensity value of each pixel is then compared to the threshold value for the column that includes the pixel.

In U.S. Pat. No. 4,903,316 there is disclosed an apparatus for transforming an image or a document into a binary image. Several surrounding subwindows are disposed around a target subwindow enclosing a target pixel. The subwindows are separated from each other, preferably at a distance that is larger than the character line width. An average intensity value is calculated for each subwindow, and based on the intensity values of the subwindows, an evaluation of whether certain conditions are satisfied is executed such as to determine whether the target pixel of the target subwindow belongs to a character line or not.

SUMMARY OF THE INVENTION

A main object of the present invention is the provision of a method for transforming a gray-level image which is divided into pixels, into a black-and-white image by using a threshold value calculation that considers an appropriate and relatively large neighborhood at the same time as intensity values of the original image are used only once for the threshold calculation itself.

Another object of the invention is to provide a transformation procedure that requires a relatively small memory area although a large neighborhood is considered at the threshold calculation.

Yet another object of the present invention is to transform a gray-level image into a black-and-white image in such a way that relevant information such as text is retained whereas background raster, noise and the like are filtered away.

These objects are generally attained by the fact that the method includes the steps of: calculating and storing, for each one of a number of generally square sub images of the gray-level image, at least one value; calculating and possibly storing, for each sub image, a threshold value based on the measurement values of the sub image and a number of sub images that are adjacent the sub image; and transforming, for each sub image, each pixel in the sub image to either a white or a black pixel depending upon whether the gray-level of the pixel exceeds the threshold value of the sub image or not.

Preferably, parts of the gray-level image, the measurement value or values that is/are calculated, for each sub image, and the threshold value that is calculated, for each sub image, are temporarily stored in one or more memory buffers. These data are stored only as long as they are required for calculation and/or transformation and then they are written over by new data.

The method according to the present invention is defined by the scope of the appended independent claim 1.

Further embodiments and variants of the method according to the present invention are defined by the scope of the dependent claims 2–16.

BRIEF DESCRIPTION OF THE DRAWINGS

In the following the invention will be described in more detail with reference to the appended drawings, in which.

ILLUSTRATIVE EMBODIMENTS

In accordance with the present invention there is provided a method for transforming a gray-level image, divided into pixels, into a black-and-white image, said method comprising the steps of:

dividing the gray-level image into a number of generally square sub images which comprise more than one pixel;

calculating and storing, for each sub image, at least one measurement value representing the gray-level of the sub image;

calculating, for each sub image, a threshold value based on the measurement values of the sub image and a number of sub images that are adjacent the sub image; and transforming, for each sub image, each pixel in the sub image to either a white or a black pixel depending upon whether the gray-level of the pixel exceeds the threshold value of the sub image or not.

Figure 1:
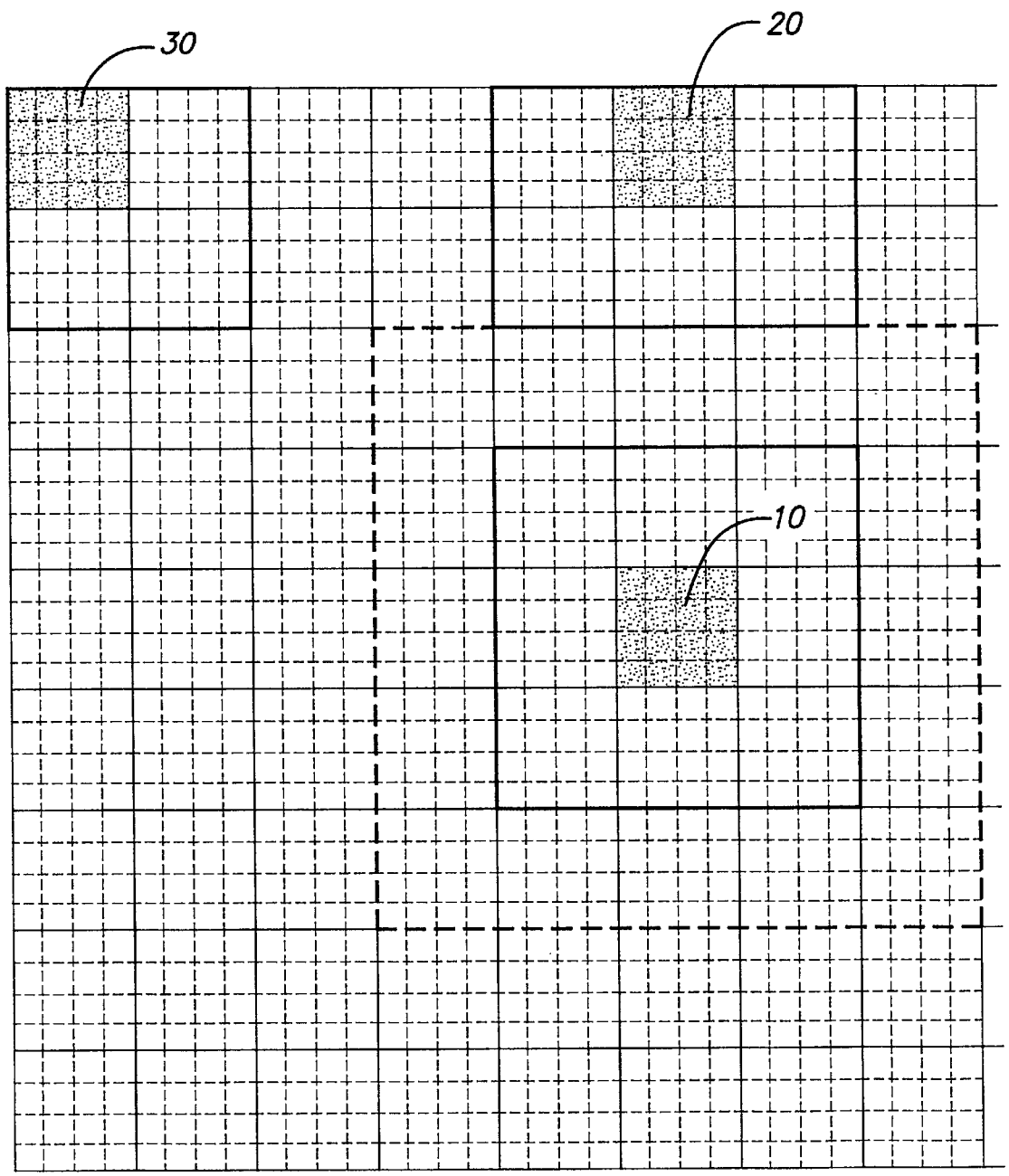
FIG. 1 shows part of an image, divided into pixels, which has been divided into a number of square sub images that are mutually arranged such that they cover the image area without overlapping each other.

According to an illustrative and preferred embodiment of the invention a gray-level image that is divided into pixels, is divided into a number of generally square sub images or as is illustrated in FIG. 1, completely square sub images, which are mutually arranged such that they cover the image area without overlapping each other. Preferably, all sub images are of the same size, 4×4 pixels by way of example, but in other embodiments these may have different sizes. In accordance with the preferred embodiment a threshold value is calculated for each sub image based on an area of the image which is larger than the respective sub image and which appropriately consists of a combination of a number of sub images. In many cases, these larger areas will overlap each other and in order to avoid repeated re-use of the gray-levels of the pixels of the image, the threshold value calculation is divided into two parts. The first part performs a calculation, for each sub image, based on the gray-levels of the pixels of the sub image. At least one measurement value is calculated for each sub image, e.g. a mean value, but in a preferred embodiment, two values are calculated, for each sub image, preferably a maximum value and a minimum value. This calculation gives results that constitute a smaller set of data than the image data from which the calculation started. These results are used in the second part of the threshold value calculation and for this reason they are stored as long as they are required for this calculation. In the second part, a threshold value is calculated, for each sub image, based on the measurement values of the sub image and a number of sub images that lie adjacent to the sub image. Due to this division of the calculation, the invention implies that data from the original image are used only once for the threshold calculation itself, whereas the results from the first part of the calculation which make up a smaller amount of data, are used several times. In accordance with the invention, there is executed a transformation, for each sub image, of each pixel of the sub image to either a white or a black pixel depending upon whether the gray-level of the pixel exceeds the threshold value of the sub image or not. When the gray-level of the pixel exceeds the threshold value of the sub image, this pixel is transformed into a white pixel, and otherwise into a black pixel.

In FIG. 1 there is illustrated part of an image, divided into pixels, which has been divided into a number of square sub images. Preferably, the image is an 8-bits gray-level image, i.e. the intensity value can be represented by one of $2^8=256$ different gray-levels. Of course, it is possible to transform other types of images, such as images of 4, 6, 10, 12, 16, 24 or 32 bits. Preferably, these image data are received, for example in the form of data signals, from some sort of scanner machine, fax machine or video equipment. As mentioned above, for each sub image, there is calculated at least one measurement value representing the sub image gray-level. A threshold value is calculated for each sub image from an appropriate and relatively large, but still local neighborhood. In the preferred embodiment of the invention the threshold value is calculated, for each sub image, based on the measurement values of the sub image and a number of sub images that are adjacent the sub image. FIG. 1 illustrates three examples of sub images 10, 20, 30 (shaded) and respective adjacent sub images from which a threshold value is calculated. For a central sub image 10, i.e. a sub image which is not situated at the border of the image area, the sub images that are used for the threshold value calculation suitably form a square 3×3 matrix of sub images (broad line). The sub image (shaded) for which the threshold value is calculated is then situated in the centre of this matrix and surrounded by adjacent sub images. In another embodiment, measurement values for yet a number of sub images which are adjacent the sub images that are adjacent the sub image can be used at the threshold value calculation. Consequently, in the example above with a central sub image, a 5×5 matrix of sub images (broad dashed line) can be used, and there is nothing that prevents even larger neighborhoods from being considered at the threshold calculation. Alternatively, the threshold value for a central sub image can be calculated from a smaller number of sub images, e.g. the sub image itself and the sub images that are adjacent the sub image on opposite sides of the sub image in horizontal and vertical direction, respectively. For a sub image 20 situated on the edge, a threshold value is conveniently calculated from the sub image and all sub images that are adjacent the sub image, i.e. from the sub image and its closest neighborhood of sub images (broad line). Correspondingly, for a corner sub image 30, the corner sub image and the adjacent sub images, i.e. the sub image and the three closest sub images (broad line), are considered at the threshold calculation. In an alternative embodiment, the transformation method according to the invention is applied only to central sub images and consequently sub images situated on the edge or in a corner are processed by another method, e.g. by static thresholding with a fixed threshold value.

As mentioned above, a maximum value and a minimum value are preferably calculated, for each sub image, based on the gray-levels of the pixels of the sub image. In the preferred embodiment, the threshold value is then calculated, for each sub image, as an average value of the greatest of the maximum values of the sub image and a number of sub images that are adjacent the sub image and the smallest of the minimum values of the sub image and a number of sub images that are adjacent the sub image. Possibly, this is somewhat modified such that the threshold is set a little bit closer to the black level or the white level so as to get a "thinner" image and a "fatter" image, respectively. This is achieved by calculating the threshold value as a weighted mean value of the greatest of the maximum values of the sub image and a number of sub images that are adjacent the sub image and the smallest of the minimum values of the sub image and a number of sub images that are adjacent the sub image. It is also possible to add or subtract a constant to the above calculated average value.

For areas which do not contain both such things that are to be interpreted as black and such things that are to be interpreted as white, another rule for threshold value calculation should be applied. If the difference between the greatest of the maximum values and the smallest of the minimum values is less than a certain constant, a so called contrast limit, the threshold value can be calculated from threshold values for a number of adjacent sub images, conveniently as an average value of these. In an embodiment of the invention, the complete sub image is assumed to be either completely white or completely black when the difference is below the contrast limit, and the threshold value is assigned a constant value, i.e. a "static" threshold value is applied.

By using the method according to the invention, transformed black-and-white documents of extremely good quality and readability are obtained. Background raster and noise are effectively filtered away. Light gray text on white background is made very perceptible, and if a dark gray area exists on the same document this is of course registered as black, while black text on this background still can be made readable. The black text is then surrounded by a symmetric "halo" of white in the transformed black-and-white image.

In an alternative embodiment, a single measurement value, conveniently a mean value of the gray-levels of the sub image, is calculated, for each sub image, and then the threshold value for each sub image is advantageously calculated as an average of the mean values of the sub image and a number of sub images that are adjacent the sub image.

Yet another embodiment consists in creating, for each sub image, a histogram with a suitable number of partial intervals. Next, for each sub image, a threshold value is calculated from a combination of the histograms of the sub image and a number of sub images adjacent the sub image, e.g. by selecting the threshold value midway between the two expected peaks of the combined histogram. Advantageously, this embodiment is used for larger sub images, e.g. composed of 10×10 pixels, as a reduction of data is obtained as long as the result of the calculation for each sub image make up a smaller amount of data than the original image data from which the calculation started.

In order to minimize the necessary memory area that is required for transforming a gray-level image into a black-and-white image according to the invention, in a preferred embodiment of the invention, parts of the gray-level image, the measurement value or values that is/are calculated, for each sub image, and the threshold value that is calculated, for each sub image, are temporarily stored in one or more memory buffers. These data are stored only as long as they are needed for calculation and/or transformation and are then written over by new data.

Figure 2:
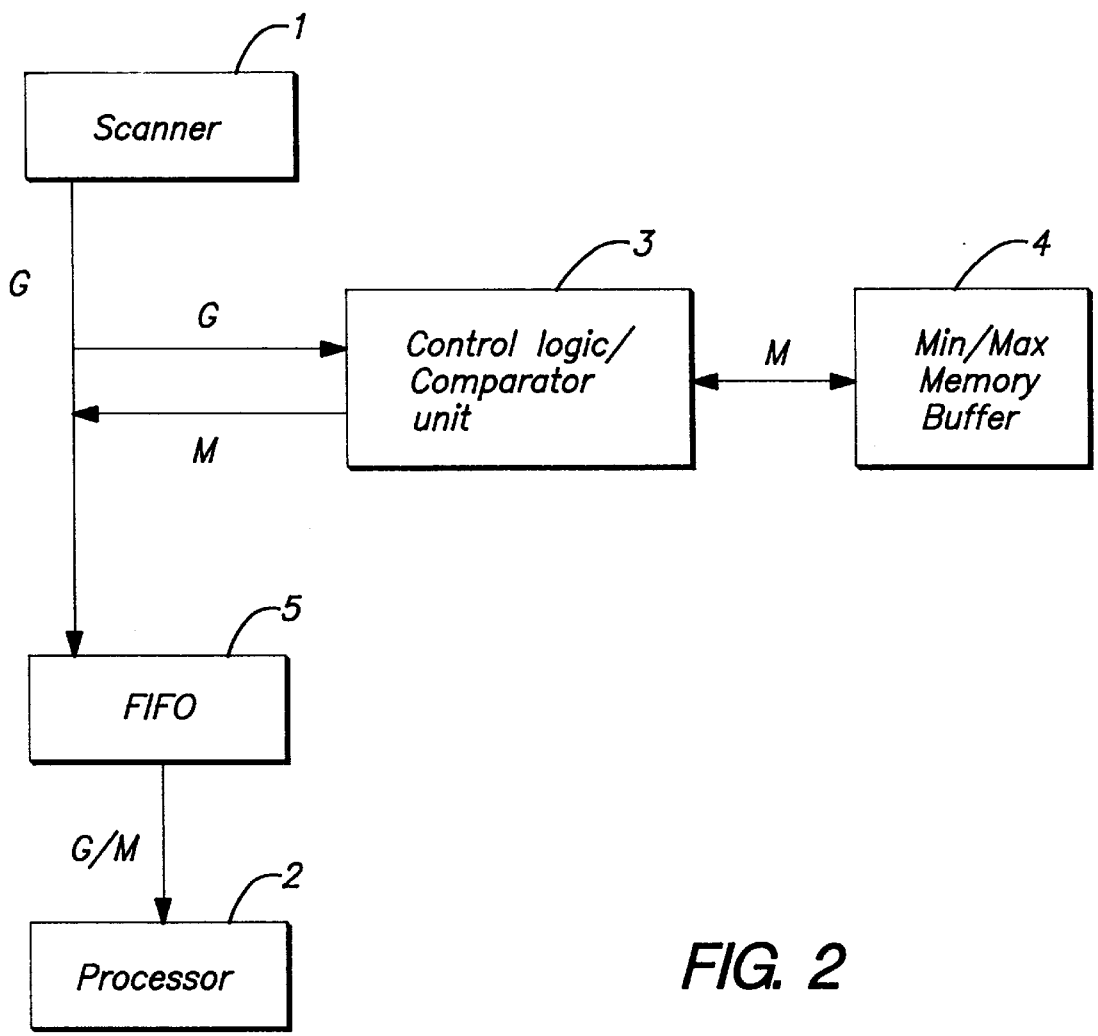
FIG. 2 is a block diagram of a device used for executing the method according to the present invention.

With reference to FIG. 2, in an illustrative embodiment of the invention, a scanner 1 scans a document or an image and produces gray-level data in the form of e.g. data signals. The designation G in FIG. 2 refers to a flow of gray-level values. M designates maximum and minimum values and G/M refers to gray-level values and maximum and minimum values interleaved with each other. Intensity values or gray-levels (1 byte per pixel by way of example) from a partial area of an image is read from the scanner 1 and fed through a control logic/comparator unit 3 and via FIFO 5 to a processor, GPU, 2. The control logic/comparator unit 3 is, by way of example, implemented in a programmable logic circuit such as LATTICE 1032. Preferably, the processor 2 is a special processor called GPU (an ASIC) which is created by Imsys AB (Sweden). It is also possible to use other processors, e.g. any of the processors of the AMD 29K-family or the INTEL i960 processor.

Each read partial area, which suitably consists of n scan lines of the same width b as the complete image, is divided into a number of sub images which preferably are square and consist of n×n pixels. The control logic/comparator unit 3, which uses a special memory buffer 4 for temporary storage of temporary maximum and minimum values, calculates maximum and minimum values for each one of the sub images of the partial area based on the flow of gray-level values. The processor 2 which has a writable memory for micro programs and a larger working memory, receives, via FIFO 5, gray-level values that correspond to the partial area, and maximum and minimum values for each one of the sub images of the partial area, which are interleaved with the gray-level values. Each n:th scan line that is received is special in such a way that in this scan line there are, interleaved after each group of n pixels, a maximum value and a minimum value for the sub image that was completed by the n preceding pixels. This data flow is received by the processor 2 and the gray-level values for the partial area are stored in one part of the processor 2 working memory which will act as a first cyclical buffer. The maximum and minimum values for each one of the sub images of the partial area are extracted and stored in another part of the processor working memory which will act as a second cyclical buffer. By way of example, the first cyclical buffer contains gray-levels of pixels corresponding to two partial areas, i.e. 2×b×n bytes. For example, the second cyclical buffer contains maximum and minimum values, hereinafter referred to as pairs of values, for sub images corresponding to three partial areas.

When two partial areas have been read and received by the processor 2, whereby gray-level values for these two partial areas have been stored in the first cyclical buffer and pairs of values for sub images corresponding to these partial areas have been extracted and stored in the second cyclical buffer, then, for each sub image that belongs to the partial area that was read first, a threshold value is calculated based on the pairs of values of the sub image and a number of sub images that are adjacent to the sub image. The threshold value is calculated, preferably by a micro program routine written in the memory for micro programs of the processor 2, as a weighted average value of the greatest of the maximum values of the sub image and a number of sub images that are adjacent the sub image and the smallest of the minimum values of the sub image and a number of sub images that are adjacent the sub image. Immediately after having calculated a threshold value for a sub image, there is executed a transformation of each pixel of the sub image to either a white or a black pixel depending upon if the gray-level of the pixel exceeds the threshold level of the sub image or not. This transformation is executed by another micro program routine in the processor 2. These transformed output data, 1 bit per pixel, are suitably put together into bytes of output data and stored in yet another part of the working memory of the processor 2 for possible further processing. Note that the gray-levels of the pixels in the sub images that correspond to the partial area that was read first, are available in the first cyclical buffer.

Yet another partial area is read and fed through the control logic/comparator unit 3 to produce a flow of data that is composed of gray-level values and pairs of values. The gray-level values for the partial area that was read first which are stored in the first cyclical buffer are written over by the gray-level values of the partial area that was read last, and pairs of values for sub images corresponding to this further partial area are stored in the second cyclical buffer. Now there are pairs of values for sub images corresponding to three partial areas stored in the second cyclical buffer and, for each sub image that belongs to the secondly read partial area, a threshold value is calculated based on the pairs of values of the sub image and of a number of sub images that are adjacent the sub image. In this case also, immediately after a threshold value have been calculated for a sub image, the gray-level of each pixel of the sub image is compared with the threshold value of the sub image for transforming the pixel to either a white or a black pixel.

In the first cyclical buffer, when reading and subsequently storing gray-levels that correspond to yet another partial area, the gray-levels of the partial area that was stored first in the first cyclical buffer are written over. Upon storing, in the second cyclical buffer, of pairs of values for sub images corresponding to this partial area, the pairs of values that are stored first in the second cyclical buffer and which correspond to a complete partial area, are written over. Henceforth gray-level values, stored in the first buffer, corresponding to the two partial areas that were read last and pairs of values, stored in the second buffer, for sub images that correspond to the three partial areas that were read last, are accessible. Based on these data, a threshold value is calculated, for each sub image that belongs to the partial area that was read before the last one, and each pixel of the sub image is transformed, immediately after the threshold value calculation for the respective sub image, to a white or a black pixel by comparing the gray-level of the pixels with the threshold value of the sub image. Correspondingly, the steps described above are repeated until the complete gray-level image has been transformed into a black-and-white image.

The units included in the device according to FIG. 2 are mainly conventional units or composed of conventional electronic equipment.

In another embodiment, the transformation of the pixels of the sub images is executed only after a threshold value has been calculated for all sub images that belong to a complete partial area by temporarily storing the threshold values in a further memory area. However, if the method according to the invention is applied only to the central sub images, the necessary memory area can be reduced and the further memory area for storing threshold values avoided. When gray-level values, stored in the first buffer, corresponding to two partial areas and pairs of values, stored in the second buffer, for sub images corresponding to three partial areas are accessible, a threshold value is calculated, for each one of the central sub images that belongs to the partial area that was read before the last one, from the pairs of values of the sub image and of sub images that are adjacent the sub image. As soon as a threshold value has been calculated for one of the sub images, this is stored in the second cyclical buffer, whereby one of the values in the pair of values that no longer is needed for the continuous threshold value calculation is written over. This pair of values corresponds to a sub image that lies adjacent to the sub image for which the threshold value was most recently calculated, but is not adjacent any of the following central sub images. It is because of this the pair of values is no longer needed for the threshold value calculation which is based on a sub image and the pairs of values of sub images that lie adjacent to the sub image. Hence, for natural reasons, the pair of values, or more precisely, one of its two values, can be written over by the just calculated threshold value. Consequently, threshold values are calculated and stored, for each one of the central sub images belonging to the partial area that was read before the last one. Next, the transformation of each pixel in these sub images is performed by comparing the gray-level of the pixels of a sub image with the threshold value of the respective sub image. Preferably, this transformation is executed in parallel with the reading/reception and the storage of gray-levels and pairs of values for a new partial area. In this case, the first cyclical buffer contains e.g. gray-levels of pixels corresponding to three partial areas, i.e. 3×b×n bytes, whereby the reading, which is parallel to the transformation, of gray-levels for new scan lines can be executed faster than the transformation itself. The sub images on the edge and in the corners are advantageously transformed by a so called static threshold method, the gray-levels of the pixels in these sub images being compared with a fixed threshold value. Successive partial areas are processed correspondingly until a complete image has been transformed.

Consequently and in accordance with the invention, there is provided a method which generates a black-and-white image of extremely good readability at the speed of the scanner (10 pages per minute), to a low cost and by using a minimum of memory area in relation to the neighborhood that is considered at the threshold value calculation.

I claim:

1. A method for transforming a gray-level image which is divided into pixels, into a black-and-white image, comprising the steps of:
   dividing said gray-level image into a number of generally square and non-overlapping sub images that are mutually arranged to cover said gray-level image, each one of said sub images comprising more than one pixel;
   calculating, for each one of said sub images, a first maximum value and a first minimum value based on the gray-levels of the pixels in the sub image;
   calculating, for each one of said sub images, a threshold value by:
      determining a primary maximum value from the first maximum values of the sub image and a number of sub images that are adjacent the sub image;

determining a primary minimum value from the first minimum values of the sub image and a number of sub images that are adjacent the sub image; and calculating a weighted average value of the primary maximum value and the primary minimum value as the threshold value; and transforming, for each one of said sub images, each pixel in the sub image to either a white or a black pixel depending upon whether the gray-level of the pixel exceeds the threshold value of the sub image or not.

2. A method according to claim 1, wherein said gray-level image is read by a scanner, image reader or equivalent.

3. A method according to claim 1, wherein at least one part of said gray-level image is temporarily stored in a memory buffer.

4. A method according to claim 1, wherein said first maximum value and said first minimum value calculated for each sub image are temporarily stored in a memory buffer.

5. A method according to claim 1 further comprising the step of storing, for each one of said sub images, the calculated threshold value.

6. A method according to claim 1, wherein, for at least one of said sub images, the calculated threshold value is temporarily stored in a memory buffer.

7. A method according to claim 1, wherein, for at least one of said sub images, the sub images that are used in said threshold value calculation form a generally square matrix of sub images.

8. A method according to claim 1, wherein first maximum and minimum values for yet a number of sub images which are adjacent the sub images that are adjacent the sub image, are taken into account in said threshold value calculation.

9. A method according to claim 1, wherein the threshold value is calculated as a mean value of the greatest of the first maximum values of the sub image and a number of sub images that are adjacent the sub image and the smallest of the first minimum values of the sub image and a number of sub images that are adjacent the sub image.

10. A method according to claim 1, wherein the threshold value is calculated as a weighted average value of the greatest of the first maximum values of the sub image and a number of sub images that are adjacent the sub image and the smallest of the first minimum values of the sub image and a number of sub images that are adjacent the sub image.

11. A method according to claim 10, wherein, if the difference between the greatest of the first maximum values and the smallest of the first minimum values is less than a certain constant, the threshold value is calculated based on threshold values for a number of adjacent sub images or is assigned a constant value.

12. A method according to claim 1, wherein all sub images are of the same size.

13. A method for transforming a gray-level text image which is divided into pixels, into a black-and-white text image, comprising the steps of:

dividing said gray-level text image into a number of generally square and non-overlapping sub images that are mutually arranged to cover said gray-level text image, each one of said sub images comprising more than one pixel;

calculating, for each one of said sub images, a first maximum value and a first minimum value based on the gray-levels of the pixels in the sub image;

calculating, for each one of said sub images, a threshold value by:

determining a primary maximum value from the first maximum values of the sub image and a number of sub images that are adjacent the sub image;

determining a primary minimum value from the first minimum values of the sub image and a number of sub images that are adjacent the sub image; and calculating a weighted average value of the primary maximum value and the primary minimum value as the threshold value; and transforming, for each one of said sub images, each pixel in the sub image to either a white or a black pixel depending upon whether the gray-level of the pixel exceeds the threshold value of the sub image or not, whereby a black-and white text image of high readability is obtained.

* * * * *